US010592178B2

United States Patent
Tremblay et al.

(10) Patent No.: US 10,592,178 B2
(45) Date of Patent: Mar. 17, 2020

(54) PRINTING SYSTEMS FOR PRINTING A PLURALITY OF IMAGES IN A FIRST WEB AND IN A SECOND WEB AND A METHOD THEREOF

(71) Applicant: Océ Holding B.V., Venlo (NL)

(72) Inventors: Christian Tremblay, Venlo (NL); Stéphane Barizien, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/195,395

(22) Filed: Nov. 19, 2018

(65) Prior Publication Data

US 2019/0114124 A1 Apr. 18, 2019

Related U.S. Application Data

(63) Continuation of application No. PCT/EP2017/061738, filed on May 16, 2017.

(30) Foreign Application Priority Data

May 26, 2016 (EP) .................................... 16171503

(51) Int. Cl.
*G06F 3/12* (2006.01)
*B41J 15/22* (2006.01)
(Continued)

(52) U.S. Cl.
CPC .............. *G06F 3/1251* (2013.01); *B41J 3/54* (2013.01); *B41J 15/22* (2013.01);
(Continued)

(58) Field of Classification Search
None
See application file for complete search history.

(56) References Cited

U.S. PATENT DOCUMENTS 9,706,064 B2 * 7/2017 Zehler ................ H04N 1/00244
2003/0020944 A1 1/2003 Bhogal et al.
(Continued)

FOREIGN PATENT DOCUMENTS

EP 2 923 845 A1 9/2015

OTHER PUBLICATIONS

International Search Report issued in PCT/EP2017/061738 (PCT/ISA/210), dated Aug. 23, 2017.
(Continued)

*Primary Examiner* — Frantz Bataille
(74) *Attorney, Agent, or Firm* — Birch, Stewart, Kolasch & Birch, LLP

(57) ABSTRACT

A printing system for printing a plurality of images in a first web and in a second web, includes a print head; a feeder configured to feed both the first web and the second web simultaneously to the print head in a feed direction relative said print head; a user interface configured to set a printing arrangement of the plurality of images in the first web and the second web and to input the print head and the feeder for performing printing according to the printing arrangement; and a print-pause module for stopping printing of the printing arrangement, the print-pause module being configured to: provide to the user interface a print-pause arrangement in which a print-pause is arranged in the printing arrangement upstream the feed direction with respect to both the print head and a first image whose printing is being performed in the first web when the print-pause module is selected; and cooperate with the user interface to input the print head and the feed means according to the print-pause arrangement to stop printing once printing of said first image is complete.

11 Claims, 3 Drawing Sheets

(51) Int. Cl.
    *G06F 3/0484* (2013.01)
    *B41J 3/54* (2006.01)
    *G06F 3/0354* (2013.01)

(52) U.S. Cl.
    CPC ........ *G06F 3/04847* (2013.01); *G06F 3/1219* (2013.01); *G06F 3/1282* (2013.01); *G06F 3/03547* (2013.01)

(56) References Cited

U.S. PATENT DOCUMENTS

| | | | |
|---|---|---|---|
| 2004/0022568 A1* | 2/2004 | Menendez | D06P 5/30 400/76 |
| 2007/0076242 A1* | 4/2007 | Kanai | G06F 3/1204 358/1.14 |
| 2011/0069329 A1 | 3/2011 | Abe et al. | |

OTHER PUBLICATIONS

Written Opinion of the International Searching Authority issued in PCT/EP2017/061738 (PCT/ISA/237), dated Aug. 23, 2017.

* cited by examiner

PRINTING SYSTEMS FOR PRINTING A PLURALITY OF IMAGES IN A FIRST WEB AND IN A SECOND WEB AND A METHOD THEREOF

CROSS REFERENCE TO RELATED APPLICATIONS

This application is a Continuation of PCT International Application No. PCT/EP2017/061738, filed on May 16, 2017, which claims priority under 35 U.S.C. 119(a) to patent application Ser. No. 16/171,503.2, filed in Europe on May 26, 2016, all of which are hereby expressly incorporated by reference into the present application.

FIELD OF THE INVENTION

The present invention is in the field of printing systems for printing a plurality of images in a first web and in a second web simultaneously when said webs are fed to a printer head. It further relates to the field of methods for printing a plurality of images in both the first web and the second web simultaneously.

BACKGROUND OF THE INVENTION

Printing systems for printing a plurality of images in a first web and in a second web are known in the art. The printing systems comprise a print head and feed means for feeding simultaneously the first web and the second web to the print head in a feed direction. The printing systems also comprise a user interface that allows an operator to arrange the plurality of figures in a printing arrangement. In the printing arrangement said plurality are arranged adjacent to each other along the feed direction in the first web and the second web to set printing. In general, the printing arrangement can be seen in a display screen of the user interface. Then, said user interface inputs the print head and the feed means to perform printing in the first web and the second web according to the printing arrangement as said webs are to the print head.

In order to save web, the plurality of images are usually arranged in both webs close to each other along the feed direction, and in general the images of the plurality in the first web are not arranged symmetrically with respect to the images of the plurality in the second web. Thus, a problem of the above-mentioned printing systems is that they do not provide for an cost effective way to stop printing. If the operator decides to stop printing of the printing arrangement, for example by use of a stop-printing button arranged in the printing system for such a purpose, usually the two images being printed respectively in the first web and in the second web at that moment are ruined, causing an unnecessary waste of web and ink.

It is an object of the present invention to alleviate the above-mentioned problem.

DETAILED DESCRIPTION OF THE INVENTION

To this end, a first aspect of the present invention relates to a printing system for printing a plurality of images in a first web and in a second web, the printing system comprising:

a) a print head;
b) feed means for feeding both the first web and the second web simultaneously to the print head in a feed direction relative said print head;
c) a user interface configured to set a printing arrangement of the plurality of images in the first web and the second web and to input the print head and the feed means for performing printing according to the printing arrangement;

wherein the printing system further comprises a print-pause module for stopping printing of the printing arrangement, the print-pause module being configured to:

provide to the user interface a print-pause arrangement in which a print-pause is arranged in the printing arrangement upstream the feed direction with respect to both the print head and a first image whose printing is being performed in the first web when the print-pause module is selected; and cooperate with the user interface to input the print head and the feed means according to the print-pause arrangement to stop printing once printing of said first image is complete. In this way, the printing system allows for an easy and cost-effective way for stopping printing because at least one of the two images being printed in the first web and in second web is totally printed, reducing waste of web and ink if printing is required to be stopped.

The printing system according to the present invention comprises a print-pause module for stopping printing. The print-pause module is configured to provide a print-pause arrangement, in general displayed in a display screen of the user interface. It may be possible that the print-pause module is configured to provide a plurality of print-pause arrangements. The print-pause arrangement is a proposed pause displayed in the printing arrangement upstream the feed direction with respect to both the print head and a first image whose printing is being performed in the first web. Thus, in the print-pause arrangements or in all the proposed print-pause arrangements, the pause is proposed once the first image being printed in the first web at the moment that the print-module pause is selected has been already printed.

The print-pause module of the present invention is also configured to cooperate with the user interface to input the print head and the feed means according to the print-pause arrangement. In case that there is a plurality of print-pause arrangements, with at least one of them. In this way, the cooperation allows for stopping printing once said first image has been printed according to the print-pause arrangements proposed.

It is important to be noted that the printing system may be a printer as known in the art, such as a roll to roll printer, further comprising the print-pause module. The print-pause module may be attached to the printer or in signal communication with it. The print-pause module may comprise a hardware device, a software program, an electronic circuit or combinations thereof for displaying the plurality of print-pause arrangements and for cooperating with the user interface to stop printing.

In an embodiment, the print-pause is also arranged upstream the feed direction with respect to a second image of the printing arrangement whose printing is being performed in the second web when said print-pause module is selected and between said second image and a third image arranged in the printing arrangement adjacent to the second image in the second web. In this way, the printing system allows for stopping printing once both the first image and the second image, both of them being printed when the print-pause module is selected, have been printed completely.

Thus, waste of web and ink is reduced since the second image does not have to be printed again.

In an embodiment, a fourth image arranged in the printing arrangement in the first web upstream the feed direction and adjacent to the first image is re-arranged farther also upstream relative to the print-pause of the one print-pause arrangement if printing of said fourth image is incomplete once printing of the second image is complete. In this way, waste of ink is further reduced since the fourth image is not printed by the printing system once the print-pause module is selected.

In an embodiment, the printing system further comprises a memory module configured to cooperate with the print-pause module and the user interface to set a further printing arrangement comprising the images of the plurality of images whose printing is incomplete relative to the print-pause of the print-pause arrangement. In this way, the printing system allows for a quick resume of printing of the images of the plurality of images that have not been printed after said printing system stopped printing according to the print-pause arrangement.

In an embodiment, the printing system further comprises a selection module configured to cooperate with the print-pause module for selection of the print-pause arrangement from a plurality of print-pause arrangements provided by the print-pause module according to a predetermined criterion. In this way, the printing system allows for automatic selection of the print-pause arrangement of the plurality of print-pause arrangements configured in the print-pause module. The selection is done according to the predetermined criterion configured also in the print-pause module. In general, the predetermined criterion is minimum waste of time. However, other criteria may be minimum waste of paper, print images having the same client, rush jobs, shipping deadline, images having a same finishing step, etc. The selection module may comprise a hardware device, a software program, an electronic circuit or combinations thereof for performing the cooperation with the print-pause module.

In an embodiment, the display screen is arranged in a touchscreen for allowing touch-selection of the print-pause arrangement from the plurality of print-pause arrangements. In this way, one print-pause arrangement can be easily selected.

In an embodiment, the print-pause is capable of being moved relative to the images of the printing arrangement whose printing is incomplete for selection of the print-pause arrangement. In this way, the printing system provides the plurality of print-pause arrangements in a more simple way. Further, the display screen may be smaller.

The second aspect of the present invention relates to a method for printing a plurality of images with a printing system comprising a print head, the method comprising the steps of:

a) setting arrangement of the plurality of images in the first web and the second web in a printing arrangement; and
b) feeding simultaneously the first web and the second web to the print head in a feed direction relative to said print head for performing printing according to the printing arrangement;

wherein the printing system further comprises a print-pause module for stopping printing of the printing arrangement, the print-pause module being configured to provide, when in use, a plurality of print-pause arrangements, each of them comprising a print-pause being arranged in the printing arrangement upstream the feed direction with respect to both the print head and a first image whose printing is being performed in the first web and wherein the method further comprises the step of selecting a print-pause arrangement of the plurality of print-pause arrangements to stop printing once printing of said first image is complete. In this way, the operator of the printing system can stop printing the printing arrangement in an easy and cost effective way according to his needs.

In the method, a printing system comprising a print-pause module is used. Thus, if the operator needs to stop printing for whatever reason, he can select the print-pause module, in general via a button. The print-pause module provides then a plurality of print-pauses arrangements to the operator, for example via a display screen arranged in the user interface. Subsequently, the operator can select a print-pause arrangement of the plurality that better suits his needs, saving web and ink, to stop printing.

The plurality of print-pause arrangements may be provided according to a predetermined criterion configured also in the print-pause module. In general, the predetermined criterion is minimum waste of time. However, other criteria may be minimum waste of paper, print images having the same client, rush jobs, shipping deadline, images having a same finishing step, etc.

In an embodiment, the print-pause in at least one print-pause arrangement of the plurality of print-pause arrangements is also arranged upstream the feed direction with respect to a second image of the printing arrangement whose printing is being performed in the second web and between said second image and a third image arranged in the printing arrangement adjacent to the second image in the second web; and wherein the method comprises the step of selecting the at least one print-pause arrangement to stop printing of the printing arrangement once printing of said second image is also complete and before printing of the third image starts. In this way, the operator of the printing system can stop printing once both the first image in the first web and the second image in the second web have been printed completely by selection of the at least one print-pause arrangement.

In an embodiment, a fourth image of the printing arrangement arranged in the first web upstream the feed direction with respect to the first image is re-arranged upstream relative to the print-pause of the at least one print-pause arrangement if printing of said fourth image is incomplete once printing of the second image is complete; and wherein in the method said fourth image is not printed when said second image is being printed. In this way, the at least one print-pause arrangement allows for stopping printing of the printing arrangement once the first image in the first web and the second image in the second web and without performing printing of the fourth image adjacent to the first image in the first web. Thus, ink is saved.

Finally, a third aspect of the present invention relates to a non-transitory recording medium comprising computer-executable program code configured to instruct a computer to perform a method as described above.

BRIEF DESCRIPTION OF THE DRAWINGS

For the purpose of illustrating the present invention, the drawings show aspects of one or more embodiments of said invention. However, it should be understood that the present invention is not limited to the precise arrangements and instrumentalities shown in the drawings, wherein.

DETAILED DESCRIPTION OF THE DRAWINGS

It should be noted that items which have the same reference numbers in different figures, have the same structural features and the same functions. Where the function and/or structure of such item has been explained, there is no necessity for repeated explanation thereof in the detailed description.

It should be noted that the above-mentioned embodiments illustrate rather than limit the present invention, and that those skilled in the art will be able to design many alternative embodiments.

Figure 1A:
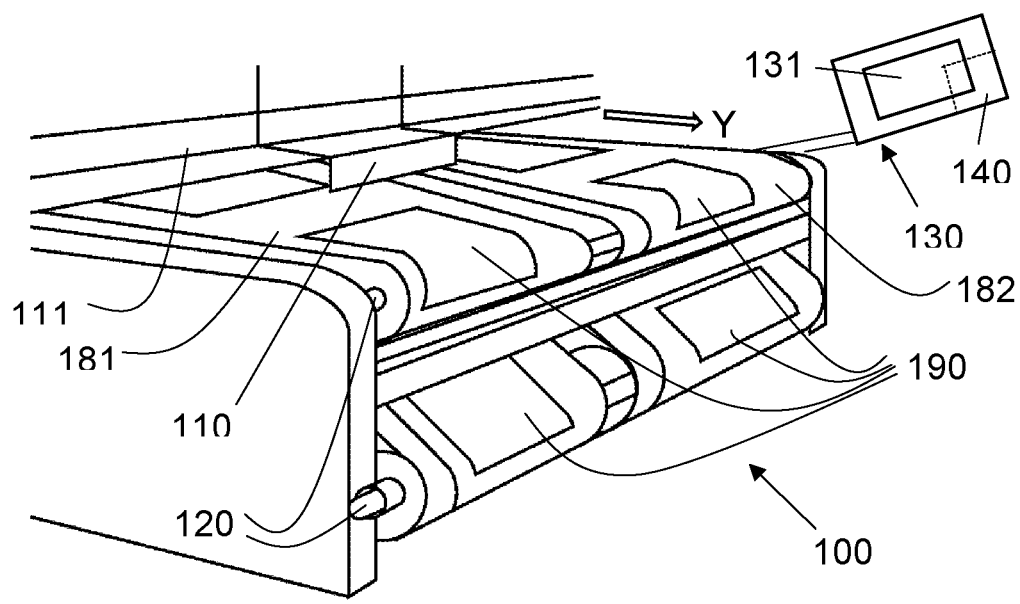
FIG. 1A is a view of a printing system according to the present invention.

FIG. 1A depicts a schematic view of a printing system 100 according to an example of the present invention. The printing system 100 comprises a roll to roll printer 101 comprising a print head 110, feed means 120 and a user interface 130 having a display screen 131. The printing system 100 further comprises a print-pause module 140 arranged within the user interface 130 of the roll to roll printer 101. It is important to note that in a more specific example, the user interface 130 and the print-pause module 140 may be arranged in a separated module detached but in signal communication with the roll to roll printer.

Figure 1B:
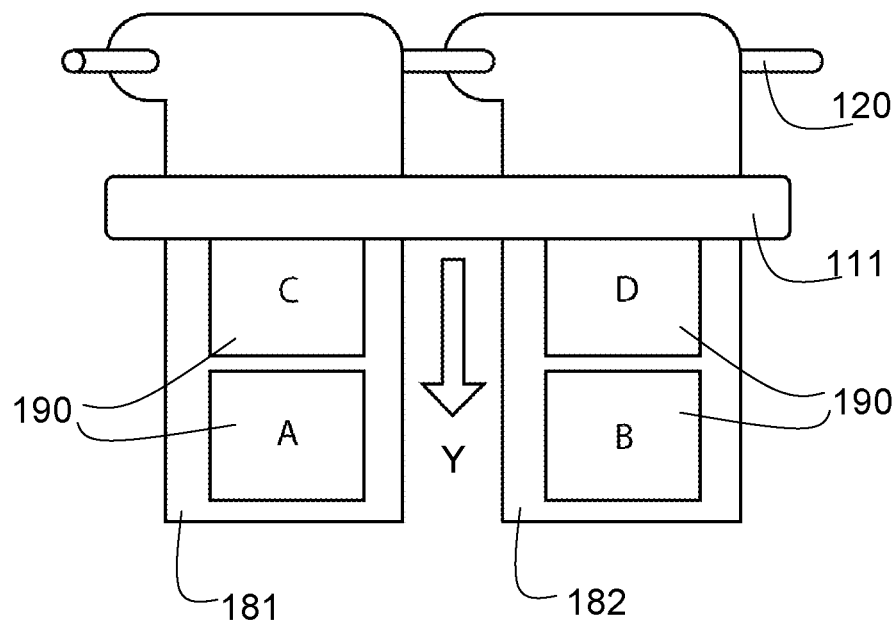
FIG. 1B is a schematic view of printing being performed by the printing system depicted in FIG. 1A.

FIG. 1B depicts an schematic view of the printing process by using the printing system 100. The feed means 120 are arranged to transport a first web 181 and a second web 182, in the present example from a first paper roll and a second paper roll not shown. Thus, the first web 181 and the second web 182 are fed to the print head 110 in a feed direction Y shown by an arrow depicted in FIG. 1B. Then, by movement of the print head 110 along a gantry 111, a plurality of images 190 can be printed in both the first web 181 and the second web 182 simultaneously.

The printing system 100 allows for arrangement of the plurality of images 190. An operator of the printing system 100 may decide the order and distribution of the plurality of images 190 in the first web 181 and the second web 182 in a printing arrangement. In the present example, the printing arrangement is set by the operator via the user interface 130. Then, the user interface 130 inputs the print head 110 and the feed means 120 according to the printing arrangement to perform printing of the plurality of images 190. Thus, FIG. 1B depicts images A and B as well as parts of the images C and D that have been already printed.

Figure 2:
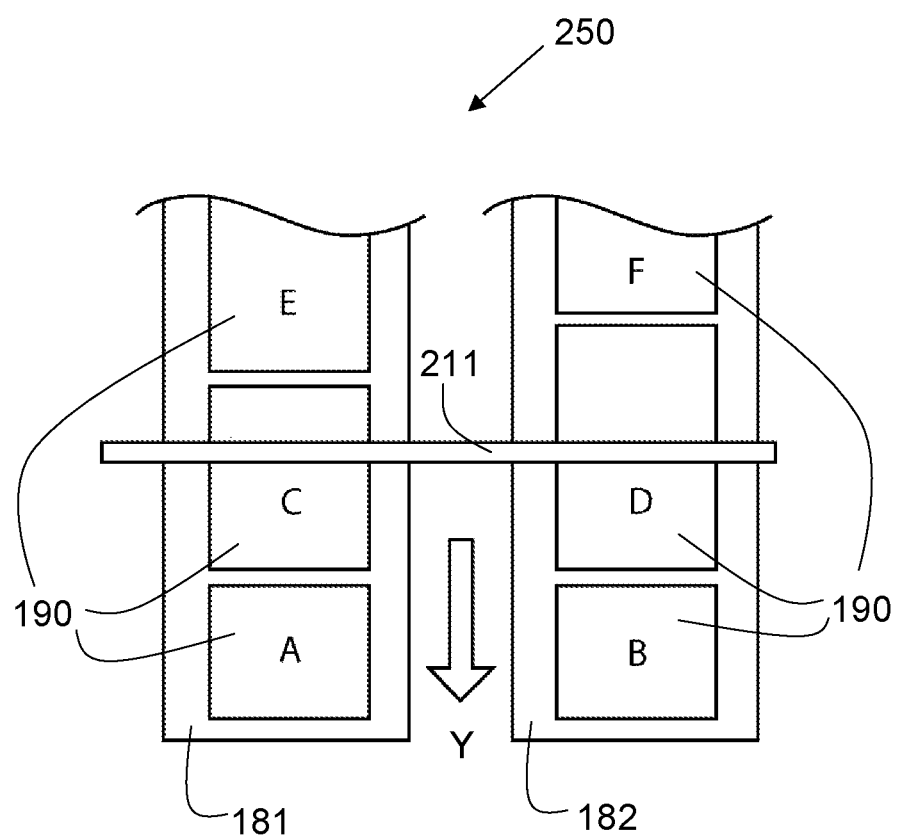
FIG. 2 is a printing arrangement of a plurality of images to be printed by using the printing system depicted in FIG. 1A.

As a mode of example, FIG. 2 shows an example of a printing arrangement 250 for printing images A, B, C, D, E and F of the plurality 190. The printing arrangement 250 is displayed in the display screen 131 of the user interface 130 showing the order and distribution of said plurality of images in the first web 181 and the second web 182.

In the example of the present invention, the display screen 131 of the user interface 130 also displays the current printing status by further displaying a bar 211 representing the print head 110 and the feed direction Y represented by the arrow. For example, FIG. 2 represent a snapshot of the printing status at a moment of printing. In this way, FIG. 2 depicts upstream the feed direction Y with respect to the bar 211 the images E, F and parts of the images C and D whose printing have not been performed yet. Similarly, downstream the feed direction Y with respect to the bar 211, it is depicted images A and B as well as parts of the images C and D that have been already printed.

The printing system 100, thanks to the print-pause module 140, helps the operator to arrange a strategy to prevent waste of web and ink if the operator needs to stop printing. As a mode of example, if the operator stops printing at the moment where printing status is as depicted in FIG. 2, both images C and D will be ruined since they are not totally printed yet, causing waste of web and ink corresponding to the parts of the images C and D already printed. Plus, once printing is restored, the images C and D have to be printed from the beginning.

Instead of stopping printing, the operator may select the print-pause module 140, for example via a push button (not shown) in the user interface 130. In this way, a plurality of print-pause arrangements are provided by the print-pause module 140 and displayed in the display screen 131 for selection. The plurality of print-pause arrangements help the operator to decide on a strategy to stop printing that might still suit the need of the operator to stop printing and that helps to reduce waste of web and ink, making the stop printing process more cost effective. Examples of print-pause arrangements are depicted in FIG. 3 and FIG. 4.

Figure 3:
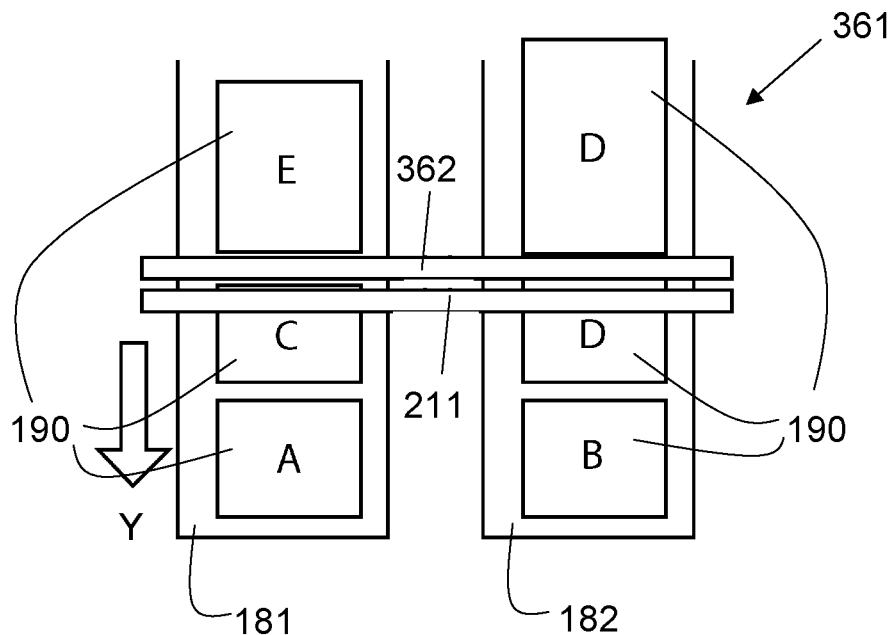
FIG. 3 is a first print-pause arrangement displayed by a print-pause module of the printing system depicted in FIG. 1A.

FIG. 3 shows a first print-pause arrangement 361 of the plurality. The first print-pause arrangement 361 comprises a print-pause 362. The print pause 362 is a pause proposed by the print-pause module 140 in the print arrangement 250. Said print-pause 362 is arranged upstream the feed direction Y with respect to the bar 211. Thus, if the operator selects the first print-pause arrangement via the user interface 130, the printing system 100 will stop printing at the moment said first printing pause 362, which moves, in the display screen 131, in the feed direction towards the bar 211 as printing is being performed, reaches said bar 211.

It is important to note that the print-pause 362 is also proposed in the printing arrangement 250 upstream the feed direction with respect to the image C whose printing is being performed in the first web by the print head 110 when the print-pause module 140 is selected. Further, the print-pause 362 is proposed between the image C and the image E arranged in the first web 181 upstream with respect said image C. Thus, if the operator selects said first print-pause arrangement 361, the printing system 100 will stop printing once said image C has been totally printed.

Figure 4:
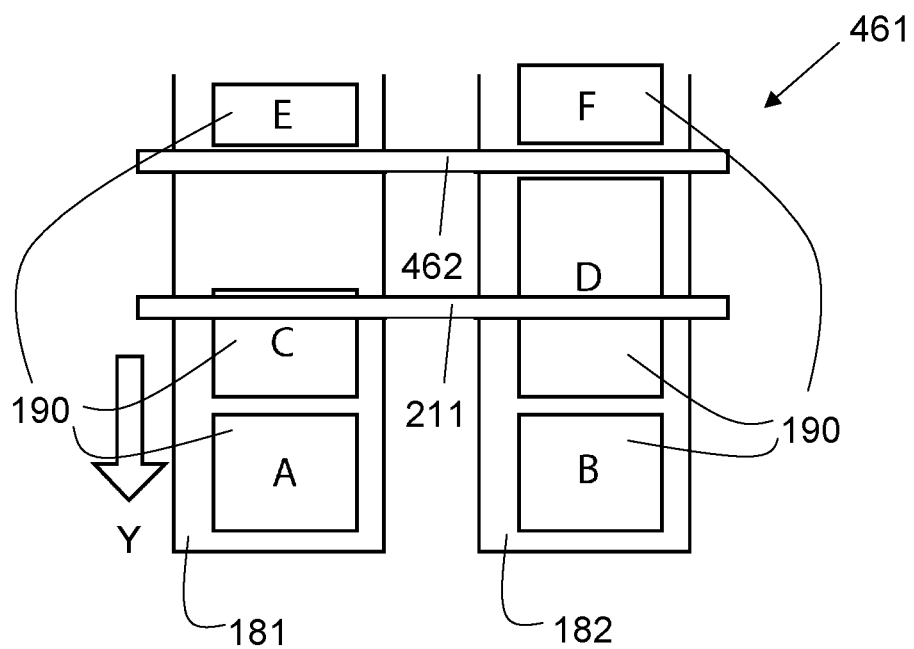
FIG. 4 is a second print-pause arrangement displayed by the print-pause module of the printing system depicted in FIG. 1A.

On the other hand, FIG. 4 depicts a second print-pause arrangement 461 proposing a print-pause 462. In contrast to the print-pause 362, the print pause 462 is a pause proposed in the print arrangement 250 upstream the feed direction Y with respect to both the bar 211 and the image D whose printing is being performed in the second web when said print-pause module 140 is selected. Further, the print-pause 462 is arranged between said image D and the image F arranged adjacent to the image D in the second web. Therefore, if the operator selects the second print-pause arrangement 461, the printing system 100 will stop printing once both the image C of the first web 181 and the image D of the second web have been totally printed.

Further, FIG. 4 shows that the print-pause module 140 has been configured such that in the second print-pause arrangement 461, the image E has been re-arranged upstream the feed direction Y with respect to the print-pause 462. This means that if said second print-pause arrangement is selected by the operator, the printing of said image E is not performed in the first web after the image C while printing of the image D is being finished in the second web 182.

The first print-pause arrangement 361 and the second print-pause arrangement 461 are examples of arrangements of the plurality proposed by the print-pause module 140 at the moment of printing depicted in FIG. 2 wherein a criterion in common to both is a minimum waste of time from the moment in which the print-pause module has been selected by the operator. However, the print-pause module can be also configured to provide print-pause arrangements according to a different criterion. As a mode of example, the criterion could be:

taking into account images related to a same customer;
    taking into account rush jobs without pausing;
    print jobs having a same shipping deadline;
    print jobs having a same finishing step;
    the amount of wasted web (paper), etc.

In any case, it is important to be noted that the print-pause in any of the proposed print-pause arrangements of the plurality is in the printing arrangement upstream the feed direction with respect to both the print head and the image C whose printing is being performed in the first web when the print-pause module is selected.

Once the first print-pause arrangement 361 and the second print-pause arrangement 461 are displayed in the display screen 131, the operator may select one of them to stop printing. This can be done since the print-pause module 140 is configured to cooperate with the user interface 130 to input the print head 110 and the feed means 120 according to the selected print-pause arrangement.

In a different example of the printing system, a selection module (not shown) of said printing system may be configured to cooperate with the print-pause module for selection of one of the print-pause arrangements of the plurality according to any of the above mentioned predetermined criteria. In this way, the selection of the print-pause arrangement is not done by the operator, but by the selection module once the print-pause module is selected by said operator.

Also, the printing system according to the present invention may comprise a memory module configured to cooperate with the print-pause module and the user interface to set a further printing arrangement comprising the images of the plurality of images whose printing is incomplete relative to the print-pause of the print-pause arrangement that has been selected. Thus, printing may be resumed in a fast way by the printing system.

The invention claimed is:

1. A printing system for printing a plurality of images in a first web and in a second web, the printing system comprising:
    a print head;
    a feeder configured to feed both the first web and the second web simultaneously to the print head in a feed direction relative said print head;
    a user interface configured to set a printing arrangement of the plurality of images in the first web and the second web and to input the print head and the feeder for performing printing according to the printing arrangement; and
    a print-pause module for stopping printing of the printing arrangement, the print-pause module being configured to:
        provide a print-pause arrangement displayed in a display screen of the user interface, the print-pause arrangement comprising a proposed print-pause displayed in the printing arrangement upstream the feed direction with respect to both the print head and a first image whose printing is being performed in the first web when the print-pause module is selected; and
        cooperate with the user interface to input the print head and the feeder according to the print-pause arrangement to stop printing once printing of said first image is complete when the print-pause module is selected.

2. The printing system according to claim 1, wherein the print-pause is also arranged upstream the feed direction with respect to a second image of the printing arrangement whose printing is being performed in the second web when the print-pause module is selected and between said second image and a third image arranged in the printing arrangement adjacent to the second image in the second web.

3. The printing system according to claim 2, wherein a fourth image arranged in the printing arrangement in the first web upstream the feed direction and adjacent to the first image is re-arranged also upstream relative to the print-pause of the print-pause arrangement if printing of said fourth image is incomplete once printing of the second image is complete.

4. The printing system according to claim 1, wherein the printing system further comprises a memory module configured to cooperate with the print-pause module and the user interface to set a further printing arrangement comprising the images of the plurality of images whose printing is incomplete relative to the print-pause.

5. The printing system according to claim 1, wherein the printing system further comprises a selection module configured to cooperate with the print-pause module for selection of the print-pause arrangement from a plurality of print-pause arrangements provided by the print-pause module according to a predetermined criterion.

6. The printing system according to claim 5, wherein the display screen is arranged in a touchscreen for allowing touch-selection of the print-pause arrangement.

7. The printing system according to claim 6, wherein the print-pause is capable of being moved relative to the images of the printing arrangement whose printing is incomplete for selection of the print-pause arrangement.

8. A method for printing a plurality of images with a printing system comprising a print head, the method comprising the steps of:
    setting arrangement of the plurality of images in the first web and the second web in a printing arrangement; and
    feeding simultaneously the first web and the second web to the print head in a feed direction relative to said print head for performing printing according to the printing arrangement,
    wherein the printing system further comprises a print-pause module for stopping printing of the printing arrangement, the print-pause module being configured to provide, when in use, a plurality of print-pause arrangements displayed in a display screen of the user interface, each of the plurality of print-pause arrangements comprising a proposed print-pause being displayed upstream the feed direction with respect to both the print head and a first image whose printing is being performed in the first web and wherein the method further comprises the step of selecting a print-pause arrangement of the plurality of print-pause arrangements to stop printing once printing of said first image is complete.

9. The method according to claim 8, wherein the print-pause in at least one print-pause arrangement of the plurality of print-pause arrangements is also arranged upstream the feed direction with respect to a second image of the printing arrangement whose printing is being performed in the second web and between said second image and a third image arranged in the printing arrangement adjacent to the second image in the second web, and wherein the method comprises the step of selecting the at least one print-pause arrangement to stop printing of the printing arrangement once printing of said second image is also complete and before printing of the third image starts.

10. The method according to claim 9, wherein a fourth image of the printing arrangement arranged in the first web upstream the feed direction with respect to the first image is re-arranged upstream relative to the print-pause of the at least one print-pause arrangement if printing of said fourth image is incomplete once printing of the second image is complete; and wherein in the method said fourth image is not printed when said second image is being printed.

11. A non-transitory recording medium comprising computer-executable program code configured to instruct a computer to perform the method according to claim 8.

* * * * *